United States Patent
Jun et al.

(10) Patent No.: US 12,362,683 B2
(45) Date of Patent: Jul. 15, 2025

(54) APPARATUS FOR AND METHOD OF ENABLING A TWO-STAGE INVERTER TO SWITCH BETWEEN MODES

(71) Applicant: HYUNDAI AUTOEVER CORP., Seoul (KR)

(72) Inventors: Eun-Su Jun, Seoul (KR); Dong-Hwi Lim, Yongin-si (KR)

(73) Assignee: HYUNDAI AUTOEVER CORP., Seoul (KR)

( * ) Notice: Subject to any disclaimer, the term of this patent is extended or adjusted under 35 U.S.C. 154(b) by 303 days.

(21) Appl. No.: 18/074,985

(22) Filed: Dec. 5, 2022

(65) Prior Publication Data

US 2023/0179120 A1 Jun. 8, 2023

(30) Foreign Application Priority Data

Dec. 7, 2021 (KR) .......................... 10-2021-0173483

(51) Int. Cl.
*H02M 7/5387* (2007.01)
*H02P 25/18* (2006.01)
*H02P 27/08* (2006.01)

(52) U.S. Cl.
CPC ...... *H02M 7/53871* (2013.01); *H02P 25/184* (2013.01); *H02P 27/08* (2013.01); *H02P 2209/03* (2013.01)

(58) Field of Classification Search
CPC ............... H02M 7/537; H02M 7/5387; H02M 7/53871; H02M 7/5395; H02P 25/184; H02P 27/08; H02P 27/085; H02P 29/68; H02P 2209/03
See application file for complete search history.

(56) References Cited

U.S. PATENT DOCUMENTS

| | | | | |
|---|---|---|---|---|
| 11,258,391 B2* | 2/2022 | Saha | ................ | H02P 21/00 |
| 2013/0271056 A1* | 10/2013 | Bunte | ................ | H02P 29/02 |
| | | | | 318/503 |
| 2020/0059189 A1* | 2/2020 | Ohashi | ................ | H02P 27/06 |
| 2021/0167702 A1* | 6/2021 | Saha | ................ | H02P 25/16 |
| 2021/0234497 A1* | 7/2021 | Agirman | ................ | H02P 27/08 |
| 2021/0305928 A1* | 9/2021 | Jeong | ................ | B60L 50/51 |
| 2022/0199491 A1* | 6/2022 | Lee | ................ | H05K 7/20936 |
| 2023/0179086 A1* | 6/2023 | Jun | ................ | H02M 1/385 |
| | | | | 363/71 |
| 2023/0261604 A1* | 8/2023 | Saha | ................ | H02P 27/085 |
| | | | | 318/801 |

FOREIGN PATENT DOCUMENTS

KR 101423054 B1 7/2014

* cited by examiner

*Primary Examiner* — Fred E Finch, III
(74) *Attorney, Agent, or Firm* — Lempia Summerfield Katz LLC (57) ABSTRACT

An apparatus for enabling a two-stage inverter to switch between modes includes: a first inverter unit, a second inverter unit, a load connected between the first inverter unit and the second inverter unit, a mode switching unit connected between the load and the second inverter unit, and a control unit configured to drive the load in an one-stage inverter mode or a two-stage inverter mode by performing a control that turns on or off the mode switching unit.

19 Claims, 5 Drawing Sheets

| | $T_{vj}$ | °C |
|---|---|---|
| SiC MOSFET Virtual junction temperature | -55 ... 175 | |
| Si IGBT Operating junction temperature | -40 | 175 |

APPARATUS FOR AND METHOD OF ENABLING A TWO-STAGE INVERTER TO SWITCH BETWEEN MODES

CROSS-REFERENCE TO RELATED APPLICATION

This application claims priority to and the benefit of Korean Patent Application No. 10-2021-0173483, filed on Dec. 7, 2021, the entire contents of which are incorporated herein by reference.

FIELD

The present disclosure relates to an apparatus for and a method of enabling a two-stage inverter to switch between modes. The apparatus and the method are capable of enabling the two-stage inverter to switch between the modes to achieve high output and high efficiency.

BACKGROUND

The statements in this section merely provide background information related to the present disclosure and may not constitute prior art.

Unlike an ordinary three-phase motor inside which voltage sources are connected using a Y-connection or Δ-connection configuration, an open-end winding machine has a structure in which three lines for the voltage sources can be connected outside the open-end winding machine instead of being connected inside the open-end winding machine.

Usually, the open-end winding machine is driven using two inverters. In this case, a voltage that is to be applied to the open-end winding machine can be increased because the voltage can be output from both sides. In addition, because the voltage that is to be applied to the open-end winding machine is increased, the same effect as in a maximum 4-level inverter can be obtained.

In a case where the open-end winding machine is driven using a dual inverter (two-stage inverter), usually, a power source is connected to each of the two inverters and electric power is supplied to the open-end winding machine. However, the power source is connected only to one inverter, and the other inverter is separated from the power source. Thus, regardless of the power source, a DC link voltage to the separated inverter may be increased as desired and may be used. In this case, the separated inverter cannot continuously output effective electric power nor receive it. For this reason, the separated inverter can serve as an ineffective electric power source.

However, this structure cannot be employed as a method of increasing output when an electric motor operates at a high speed because the electric motor needs a large amount of ineffective electric power when operating at the high speed.

Usually, in a dual inverter (two-stage inverter) in the related art, two inverters on both sides are controlled using space vector PWM (SVPWM).

SUMMARY

The present disclosure provides an apparatus for and a method of enabling a two-stage inverter to switch between modes. In particular, the apparatus and the method are capable of enabling the two-stage inverter to switch between the modes based on a temperature and an operational characteristic of an inverter to achieve high output and high efficiency.

According to an aspect of the present disclosure, an apparatus for enabling a two-stage inverter to switch between modes includes: a first inverter unit; a second inverter unit; a load connected between the first inverter unit and the second inverter unit; a mode switching unit connected between the load and the second inverter unit; and a control unit configured to drive the load in a one-stage inverter mode or a two-stage inverter mode by performing control that turns on or off the mode switching unit.

In one embodiment, the control unit may drive the load in the two-stage inverter mode by turning off the mode switching unit and may drive the load in the one-stage inverter mode by turning on the mode switching unit.

In one embodiment, the mode switching unit may include: three switches $S_7$, $S_8$, and $S_9$ that are connected for phases U, V, and W, respectively. In particular, input terminals of the three switches $S_7$, $S_8$, and $S_9$ may be connected to lines, respectively, for the phases U, V, and W, and output terminals thereof may be connected in a shared manner to each other.

In one embodiment, switching elements that are used in the first inverter unit may include a SiC MOSFET, and switching elements that are used in the second inverter unit may include a Si IGBT.

In one embodiment, when a current inverter driving mode is the one-stage inverter mode, a current temperature Temp of a switching element (SiC MOSFET) is lower than a first reference temperature T_limit_1, and a modulation index M.I is lower than a minimum value Hys.Min of a designated hysteresis loop, the control unit may drive the two-stage inverter in the one-stage inverter mode, but using a space vector pulse width modulation (SVPWM) technique.

In one embodiment, when a current inverter driving mode is the one-stage inverter mode, a current temperature Temp of a switching element (SiC MOSFET) of the first inverter unit is lower than a first reference temperature T_limit_1, and a modulation index M.I is higher than a minimum value Hys.Min of a designated hysteresis loop and is not lower than a maximum value Hys.Max of the designated hysteresis loop, the control unit may drive the two-stage inverter in the two-stage inverter mode, but using a space vector pulse width modulation (SVPWM) technique.

In one embodiment, when a current inverter driving mode is the one-stage inverter mode, a current temperature Temp of a switching element (SiC MOSFET) of the first inverter unit is lower than a first reference temperature T_limit_1, and a modulation index M.I is higher than a minimum value Hys.Min of a designated hysteresis loop and is lower than a maximum value Hys.Max of the designated hysteresis loop, the control unit may not change the current inverter driving mode.

In one embodiment, when a current inverter driving mode is not the one-stage inverter mode, and a current temperature Temp of a switching element (Si IGBT) of the second inverter unit is not lower than a second reference temperature T_limit_2, the control unit may drive the two-stage inverter in the two-stage inverter mode, but using a DPWM technique.

In one embodiment, when a current inverter driving mode is not the one-stage inverter mode, a current temperature Temp of a switching element (Si IGBT) of the second inverter unit is lower than a second reference temperature T_limit_2, and a modulation index M.I is not lower than a maximum value Hys.Max of a designated hysteresis loop, the control unit may drive the two-stage inverter in the two-stage inverter mode, but using an SVPWM technique.

In one embodiment, when a current inverter driving mode is not the one-stage inverter mode, a current temperature Temp of a switching element (Si IGBT) of the second inverter unit is lower than a second reference temperature T_limit_2, a modulation index M.I is lower than a maximum value Hys.Max of a designated hysteresis loop, and the modulation index M.I is higher than a minimum value Hys.Min of the designated hysteresis loop and is not lower than the maximum value Hys.Max of the designated hysteresis loop, the control unit may drive the two-stage inverter in the one-stage inverter mode, but using an SVPWM technique.

In one embodiment, when a current inverter driving mode is not the one-stage inverter mode, a current temperature Temp of a switching element (Si IGBT) of the second inverter unit is lower than a second reference temperature T_limit_2, a modulation index M.I is lower than a maximum value Hys.Max of a designated hysteresis loop, and the modulation index M.I is higher than a minimum value Hys.Min of the designated hysteresis loop and is lower than the maximum value Hys.Max of the designated hysteresis loop, the control unit may not change the current inverter driving mode.

According to another aspect of the present disclosure, a method of enabling a two-stage inverter to switch between modes includes: checking, by a controller of a two-stage inverter, whether or not a current inverter driving mode is a one-stage inverter mode; comparing, by the controller, a current temperature Temp of a switching element (SiC MOSFET) of a first inverter unit with a first reference temperature T_limit_1; and driving, by the controller, the two-stage inverter in the one-stage inverter mode, but using a DPWM technique when the current temperature Temp of the switching element (SiC MOSFET) of the first inverter unit is not lower than the first reference temperature T_limit_1.

The method may further include: driving, by the control unit, the inverter in the first-stage inverter mode, but using an SVPWM technique, when the current inverter driving mode is the one-stage inverter mode, the current temperature Temp of the switching element (SiC MOSFET) of the first inverter unit is lower than the first reference temperature T_limit_1, and a modulation index M.I is lower than a minimum value Hys.Min of a designated hysteresis loop.

The method may further include: driving, by the control unit, the inverter in the two-stage inverter mode, but using an SVPWM technique, when the current inverter driving mode is the one-stage inverter mode, the current temperature Temp of the switching element (SiC MOSFET) of the first inverter unit is lower than the first reference temperature T_limit_1, and a modulation index M.I is higher than a minimum value Hys.Min of a designated hysteresis loop and is not lower than a maximum value Hys.Max of the designated hysteresis loop.

The method may further include: not changing, by the control unit, a current inverter driving mode, when the current inverter driving mode is the one-stage inverter mode, the current temperature Temp of the switching element (SiC MOSFET) of the first inverter unit is lower than the first reference temperature T_limit_1, and a modulation index M.I is higher than a minimum value Hys.Min of a designated hysteresis loop and is lower than a maximum value Hys.Max of the designated hysteresis loop.

The method may further include: driving, by the control unit, the inverter in a two-stage inverter mode, but using the DPWM technique, when the current inverter driving mode is not the one-stage inverter mode, and a current temperature Temp of a switching element (Si IGBT) of a second inverter unit is not lower than a second reference temperature T_limit_2.

The method may further include: driving, by the control unit, the inverter in a two-stage inverter mode, but using an SVPWM technique, when the current inverter driving mode is not the one-stage inverter mode, a current temperature Temp of a switching element (Si IGBT) of a second inverter unit is lower than a second reference temperature T_limit_2, and a modulation index M.I is not lower than a maximum value Hys.Max of a designated hysteresis loop.

The method may further include: driving, by the control unit, the inverter in the one-stage inverter mode, but using an SVPWM technique, when the current inverter driving mode is not the one-stage inverter mode, a current temperature Temp of a switching element (Si IGBT) of a second inverter unit is lower than a second reference temperature T_limit_2, a modulation index M.I is lower than a maximum value Hys.Max of a designated hysteresis loop, and the modulation index M.I is higher than a minimum value Hys.Min of the designated hysteresis loop and is not lower than the maximum value Hys.Max of the designated hysteresis loop.

The method may further include: not changing, by the control unit, a current inverter driving mode when the current inverter driving mode is not the one-stage inverter mode, a current temperature Temp of a switching element (Si IGBT) of a second inverter unit is lower than a second reference temperature T_limit_2, a modulation index M.I is lower than a maximum value Hys.Max of a designated hysteresis loop, and the modulation index M.I is higher than a minimum value Hys.Min of the designated hysteresis loop and is lower than the maximum value Hys.Max of the designated hysteresis loop.

According to one aspect of the present disclosure, the present disclosure relates to the method of enabling a two-stage inverter to switch between modes, and the method is applicable to a one-stage inverter and the two-stage inverter. With this method, the two-stage inverter is enabled to switch between modes on the basis of a temperature and an operating characteristic of the inverter to achieve high output and high efficiency.

In addition, switching between the modes does not immediately take place at a point in time when the inverter needs to switch between the modes, and the section where the motor control is impossible is minimized through hysteresis loop control. Thus, the effect of possibly improving motor control performance can be achieved.

BRIEF DESCRIPTION OF THE DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

An apparatus for and a method of enabling a two-stage inverter to switch between modes according to first and second embodiments, respectively, of the present disclosure are described below with reference to the accompanying drawings.

For clarity and convenience in description, thicknesses of lines and sizes of constituent elements may be illustrated in non-exact proportion in the drawings. In addition, a term defined by considering a function of a constituent element according to the present disclosure to which the term is assigned is used below and may vary according to the user's or manager's intention or to practices in the art. Therefore, the term should be defined in context in light of the present specification.

When a component, device, element, or the like of the present disclosure is described as having a purpose or performing an operation, function, or the like, the component, device, or element should be considered herein as being "configured to" meet that purpose or to perform that operation or function.

Figure 1:
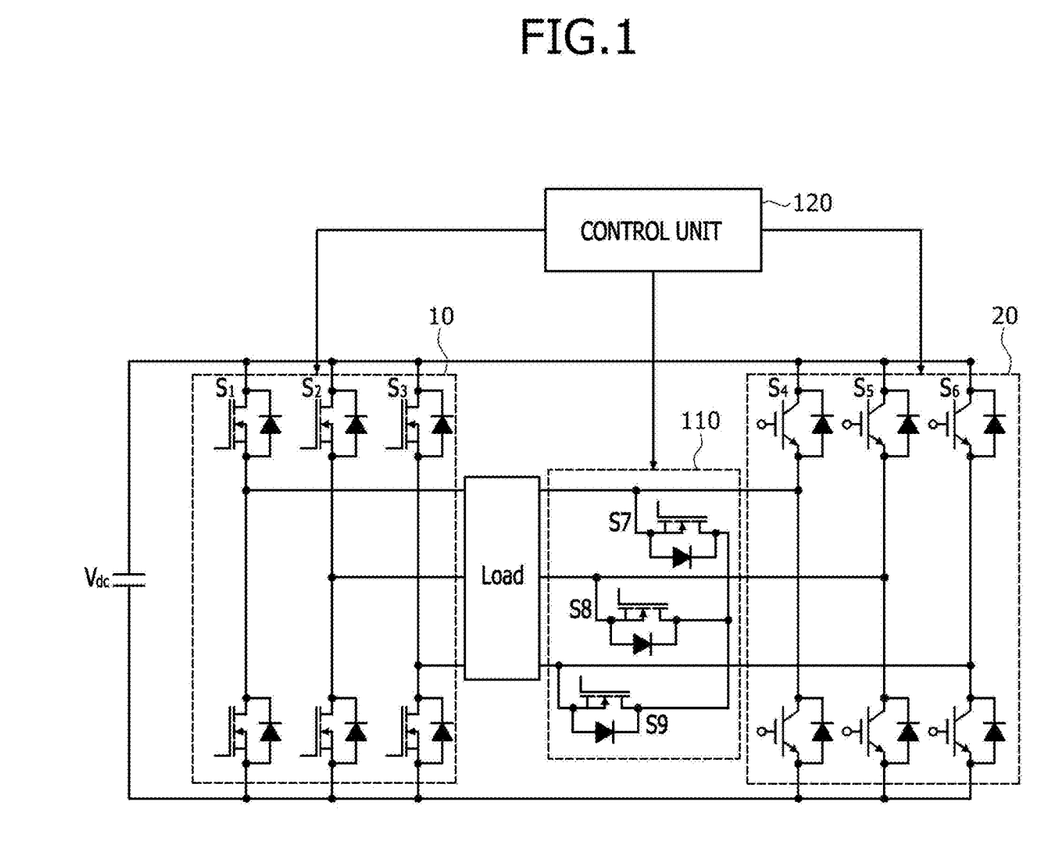
FIG. 1 is a view illustrating a schematic configuration of an apparatus for enabling a two-stage inverter to switch between modes according to a first embodiment of the present disclosure.

FIG. 1 is a view illustrating a schematic configuration of the apparatus for enabling a two-stage inverter to switch between modes according to the first embodiment of the present disclosure.

As illustrated in FIG. 1, the apparatus for enabling a two-stage inverter to switch between modes includes: a first inverter unit 10, a second inverter unit 20, a mode switching unit 110 formed between the first inverter unit 10 and the second inverter unit 20, and a control unit 120.

A load (for example, a motor) is connected between the first inverter unit 10 and the mode switching unit 110. A power source $V_{dc}$ is connected to the first inverter unit 10.

Under the control of the control unit 120, the first inverter unit 10 may apply a step voltage (for example, a six-step voltage) to the load. Under the control of the control unit 120, the mode switching unit 110 may be turned on and off. Thus, the load may be driven in a one-stage inverter mode or a two-stage inverter mode.

For example, under the control of the control unit 120, the load is driven in the two-stage inverter mode (i.e., in a high-output mode) in a case where the mode switching unit 110 is turned off, and the load is driven in the one-stage inverter mode (i.e., in a high-efficiency mode) in a case where the mode switching unit 110 is turned on.

The mode switching unit 110 includes three switches $S_7$, $S_8$, and $S_9$ that are connected for phases U, V, and W, respectively, and input terminals of the three switches $S_7$, $S_8$, and $S_9$ are connected to lines, respectively, for the phases U, V, and W, and output terminals thereof are connected in a shared manner to each other.

In a case where the control unit 120 drives the load in the one-stage inverter mode, the control unit 120 may select any one of a plurality of inverter driving techniques (Space Vector Pulse Width Modulation (SVPWM) and Discontinuous Pulse Width Modulation (DPWM) techniques) according to a pre-designated condition (for example, a temperature or a modulation index M.I) and may drive the load.

In addition, in a case where the control unit 120 drives the load in the two-stage inverter mode, the control unit 120 may select any one of the plurality of inverter driving techniques (the SVPWM and DPWM techniques) according to the pre-designated condition (for example, the temperature or the modulation index M.I) and may drive the load.

For reference, in the SVPWM technique, inverter six-phase switching is performed at a PWM carrier frequency, and inverter four-phase switching is performed at the PWM carrier frequency. Therefore, at the same carrier frequency, the number of switching phases is smaller in the DPWM technique than in the SVPWM technique. For this reason, switching loss is accordingly low. The lower the switching loss, the lower loss of heat of a switching element. Thus, the switching element is less heated.

When a high motor output is not necessary, the control unit 120 may increase efficiency through control for the one-stage inverter mode (that is, high-efficiency driving). In other words, the high-efficiency driving may be performed through control that drives only the first inverter unit 10.

In addition, when a high motor output is desired, the control unit 120 may increase an output through control for the two-stage inverter mode (i.e., high-output driving). In other words, the high-output driving may be performed through control that drives both the first inverter unit 10 and the second inverter unit 20.

Figure 2:
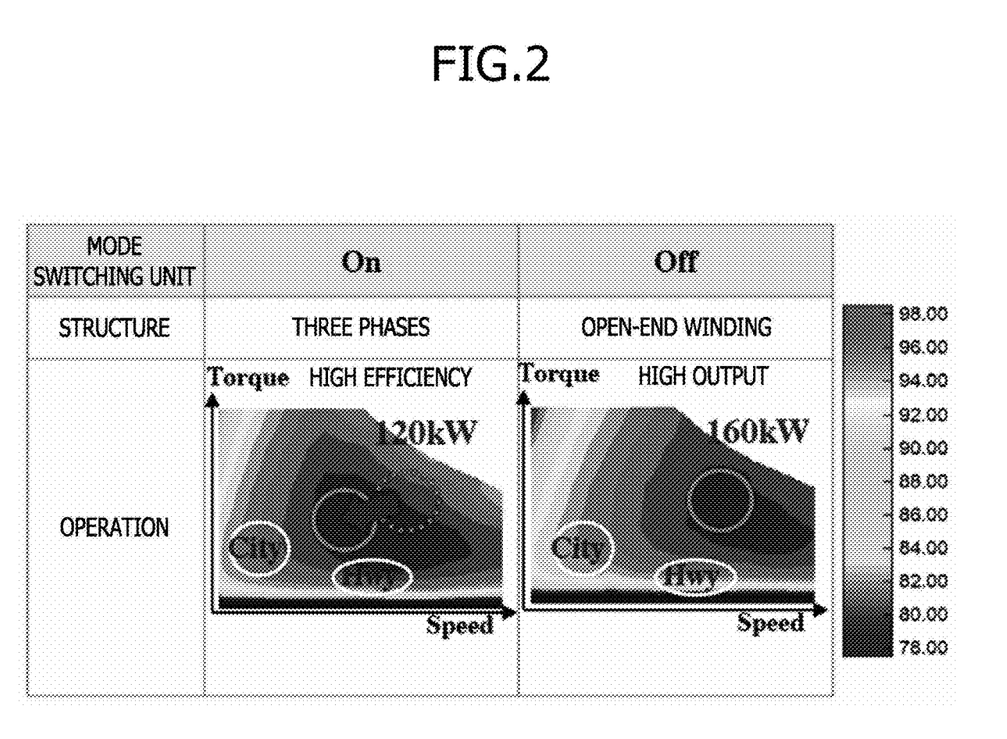
FIG. 2 is a table showing temperature distribution that varies according to an inverter driving mode in FIG. 1.

The driving of the load in the two-stage inverter mode through a turn-off control of the mode switching unit 110 by the control unit 120 means that the control unit 120 performs the high-output driving through an open-end winding technique. Moreover, the driving of the load in the one-stage inverter mode through a turn-on control of the mode switching unit 110 by the control unit 120 means that the control unit 120 performs the high-efficiency driving through a three-phase technique (refer to FIG. 2). FIG. 2 is a table showing temperature distribution that varies according to the inverter driving mode in FIG. 1.

The control unit 120 may be an ECU (Electronic Control Unit) or MCU (Micro Controller Unit) of a vehicle.

Figure 3:
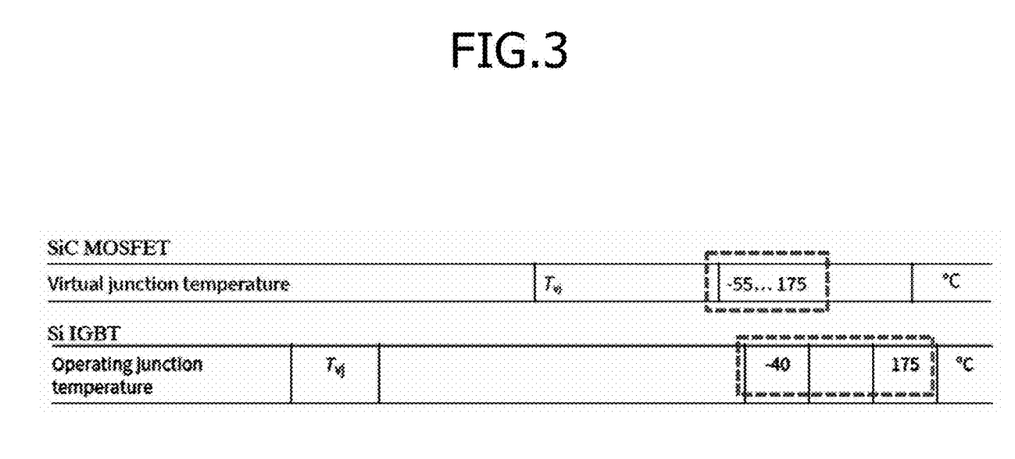
FIG. 3 is a table illustrating rated operating temperatures of switching elements of first and second inverter units in FIG. 1.

FIG. 3 is a table showing rated operating temperatures of switching elements of the first and second inverter units in FIG. 1. The rated operating temperature of a switching element (SiC MOSFET) (hereinafter, "a first switching element") that is used in the first inverter unit 10 ranges from −55 to 175 degrees (° C.). The rated operating temperature of a switching element (Si IGBT) (hereinafter, "a second switching element") that is used in the second inverter unit 20 ranges from −40 to 175 degrees (° C.).

In this case, a temperature of each switching element may be measured using its own built-in temperature sensor (not illustrated). The temperature of the switching element that does not have its built-in temperature sensor may be measured using an external separate temperature sensor (not illustrated) connected thereto.

The SiC MOSFET may be suitable for low rated electric power and thus cannot be used for high output. In contrast, the Si IGBT may be suitable for high output, but cannot achieve high efficiency. Therefore, each switching element of the first inverter unit 10 may be realized as the SiC MOSFET, and each switching element of the second inverter unit 20 may be realized as the Si IGBT.

In addition, in the one-stage inverter mode, a battery voltage cannot be sufficiently used and therefore, usually, is used only up to a linear modulation region (a modulation index M.I of 1.15). In the two-stage inverter mode, a maximum magnitude of a phase voltage that can be output is a magnitude of a voltage of the power source $V_{dc}$, and the battery voltage can be sufficiently used. Therefore, the two-stage inverter mode, rather than the one-stage inverter mode, is available for high output. However, the number of switches used in the two-stage inverter mode is greater than the number of switches used in the one-stage inverter mode. Accordingly, the two-stage inverter mode has the characteristic that its power conversion efficiency is decreased due to increase in switching loss and electric conduction loss.

Operation of the control unit 120 is also described in more detail below with reference to a flowchart in FIG. 4.

Figure 4:
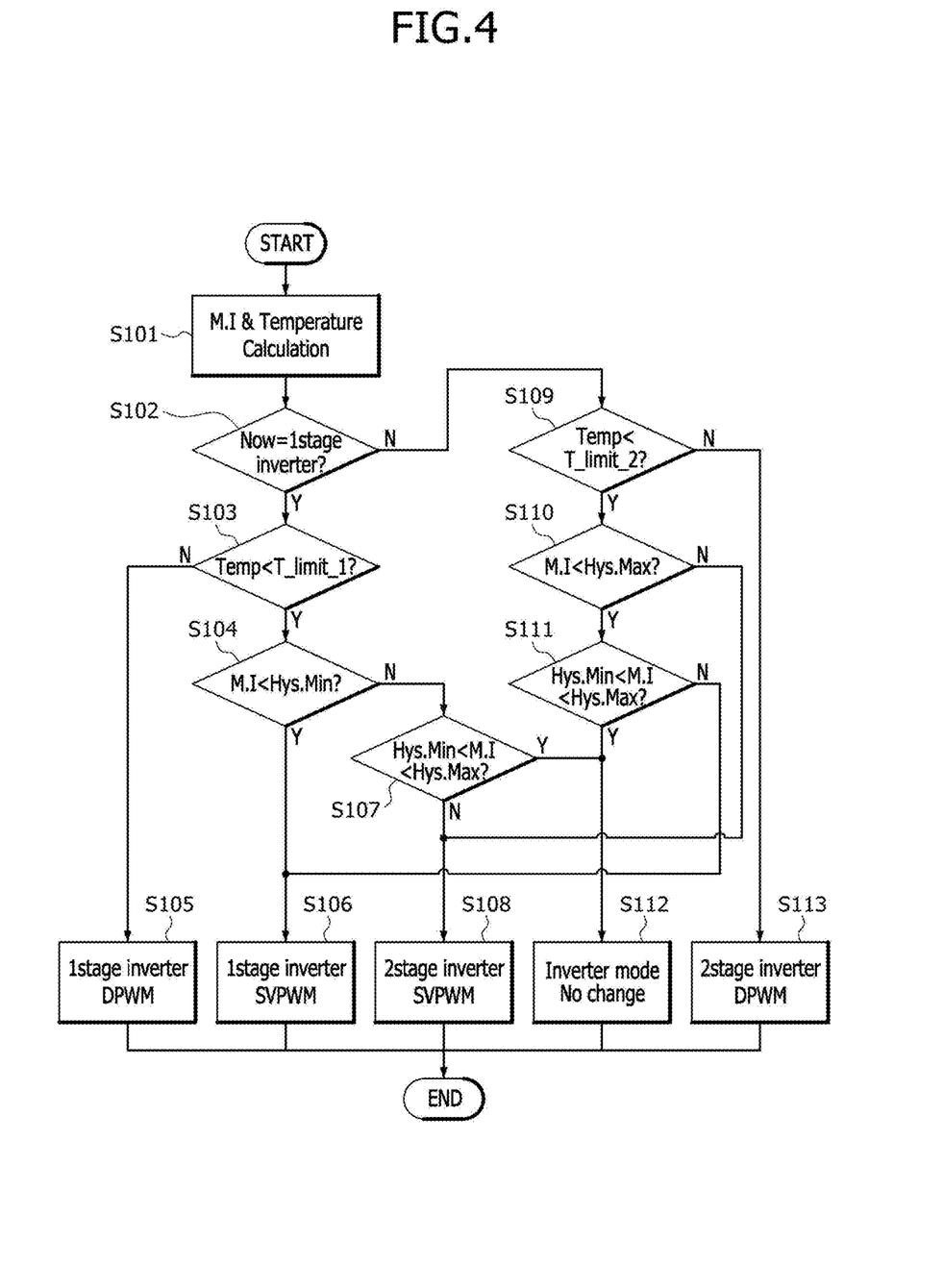
FIG. 4 is a flowchart illustrating a method of enabling a two-stage inverter to switch between modes according to a second embodiment of the present disclosure.

FIG. 4 is the flowchart illustrating the method of enabling a two-stage inverter to switch between modes according to the second embodiment of the present disclosure.

With reference to FIG. 4, the control unit 120 calculates (or measures) the temperature and modulation index M.I of each of the switching elements (for example, the SiC MOSFET and the Si IGBT) of the first inverter unit 10 and the second inverter unit 20 (S101).

In addition, in a case where a current inverter driving mode is the one-stage inverter mode (Y in FIG. S102), the control unit 120 checks whether or not a current temperature Temp of the first switching element (SiC MOSFET) is lower than a first reference temperature T_limit_1 (S103).

At this point, the first reference temperature T_limit_1 is set to approximately 70% of a maximum operating temperature of the first switching element (SiC MOSFET).

When the result of the checking (S103) is that the current temperature Temp of the first switching element (SiC MOSFET) is not lower than the first reference temperature T_limit_1 (N in S103), the control unit 120 drives an inverter in the one-stage inverter mode, but using the DPWM technique (S105).

Figure 5:
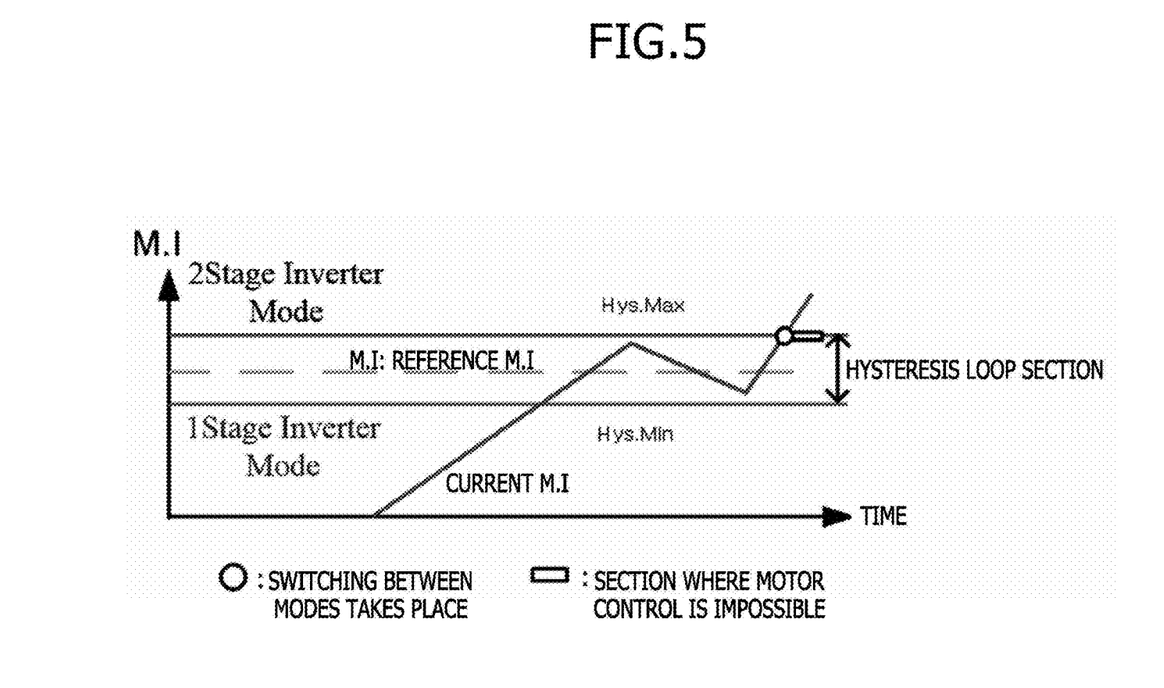
FIG. 5 is a graph illustrating a hysteresis loop section in FIG. 4.

In addition, when the result of the checking (S103) is that the current temperature Temp of the first switching element (SiC MOSFET) is lower than the first reference temperature T_limit_1 (Y in S103), the control unit 120 checks whether or not the modulation Index M.I is lower than a minimum value Hys.Min of a designated hysteresis loop (S104) (refer to FIG. 5).

When the result of the checking (S104) is that the modulation index M.I is lower than the minimum value Hys.Min of the designated hysteresis loop (Y in S104), the control unit 120 drives the inverter in the one-stage inverter mode, but using the SVPWM technique (S106).

In addition, the control unit 120 checks whether or not the result of the checking (S104) is that the modulation index M.I is higher than the minimum value Hys.Min of the designated hysteresis loop and is lower than a maximum value Hys.Max of the designated hysteresis loop (S107).

When the result of the checking (S107) is that the modulation index M.I is higher than the minimum value Hys.Min of the designated hysteresis loop and is not lower than the maximum value Hys.Max of the designated hysteresis loop (N in S107), the controller 120 drives the inverter in the two-stage inverter mode, but using the SVPWM technique (S108).

In addition, when the result of the checking (S107) is that the modulation index M.I is higher than the minimum value Hys.Min of the designated hysteresis loop and is lower than the maximum value Hys.Max of the designated hysteresis loop (Y in S107), the control unit 120 does not change the current inverter driving mode (S112).

In a case where the result of the checking (S102) is that the current inverter driving mode is not the one-stage inverter mode (N in S102), the control unit 120 checks whether or not a current temperature of the second switching element (Si IGBT) is lower than a second reference temperature T_limit_2 (S109).

In this case, the second reference temperature T_limit_2 is set to approximately 70% of a maximum operating temperature of the second switching element (Si IGBT).

When the result of the checking (S109) is that the current temperature Temp of the second switching element (Si IGBT) is not lower than the second reference temperature T_limit_2 (N in S109), the control unit 120 drives the inverter in the two-stage inverter mode, but using DPWM technique (S113).

In addition, when the result of the checking (S109) is that the current temperature Temp of the second switching element (Si IGBT) is lower than the second reference temperature T_limit_2 (Y in S109), the control unit 120 checks whether or not the modulation index M.I is lower than the maximum value Hys.Max of the designated hysteresis loop (S110) (refer to FIG. 5).

When the result of the checking (S110) is that the modulation index M.I is not lower than the maximum value Hys.Max of the designated hysteresis loop (N in S110), the control unit 120 drives the inverter in the two-stage inverter mode, but using the SVPWM technique (S108).

In addition, when the result of the checking (S110) is that the modulation index M.I is lower than the maximum value Hys.Max of the designated hysteresis loop (Y in S110), the control unit 120 checks whether or not the modulation index M.I is higher than the minimum value Hys.Min of the designated hysteresis loop and is lower than the maximum value Hys.Max of the designated hysteresis loop (S111).

When the result of the checking (S111) is that the modulation index M.I is lower than the minimum value Hys.Min of the designated hysteresis loop and is lower than the maximum value Hys.Max of the designated hysteresis loop (N in S111), the control unit 120 drives the inverter in the one-stage inverter mode, but using the SVPWM technique (S106).

In addition, when the result of the checking (S111) is that the modulation index M.I is higher than the minimum value Hys.Min of the designated hysteresis loop and is lower than the maximum value Hys.Max of the designated hysteresis loop (Y in S111), the control unit 120 does not change the current inverter driving mode (S112).

FIG. 5 is a graph illustrating a hysteresis loop section in FIG. 4. When the inverter mode is immediately entered at a reference M.I, a decrease in motor control performance occurs. Therefore, the hysteresis loop section is set to be at the reference M.1 that serves as a reference for switching the inverter mode. When the modulation index M.I is lower than the minimum value Hys.Min of the designated hysteresis loop, the inverter is driven in the one-stage inverter mode. When the modulation index M.I is higher than the maximum value Hys.Max of the designated hysteresis loop, the inverter is driven in the two-stage inverter mode. Thus, a section where motor control is impossible is minimized when performing mode switching.

As described above, the mode switching method according to the second embodiment of the present disclosure is applicable to the one-stage inverter and the two-stage inverter. The two-stage inverter is enabled to switch between the one-stage inverter mode and the two-stage inverter mode on the basis of a temperature and an operational characteristic of the inverter. Thus, high output and high efficiency can be achieved. In addition, switching between the modes does not immediately take place at a point in time when the inverter needs to switch between the modes, and the section where the motor control is impossible is minimized through hysteresis loop control. Thus, the effect of possibly improving motor control performance can be achieved.

The embodiments of the present disclosure are described only in an exemplary manner, with reference to the drawings. It would be understandable to a person of ordinary skill in the art to which the present disclosure pertains that various other modifications and equivalents are possible from this description. Thus, the technical scope of the present disclosure should be defined by the following claims. In addition, the features described in the present specification, for example, may be realized in the form of a method, a process, an apparatus, a software program, a data stream, or a signal. The features, although described in context of a single form (for example, described as only in the form of a method) may also be realized in a different form (for example, in the form of an apparatus or a program). The apparatus may be realized in the form of adequate hardware, software, firmware, or the like. The method, for example, may be realized in a computer, a microprocessor, or a device, such as a processor that generally refers to a processing device, such as an integrated circuit or a programmable logic device.

What is claimed is:

1. An apparatus for enabling a two-stage inverter to switch between modes, the apparatus comprising:
   a first inverter unit;
   a second inverter unit;
   a load connected between the first inverter unit and the second inverter unit;
   a mode switching unit connected between the load and the second inverter unit; and
   a control unit configured to drive the load in a one-stage inverter mode or a two-stage inverter mode by performing a control that turns on or off the mode switching unit,
   wherein the control unit further configured to determine a drive mode of the modes of the two-stage inverter based on a current inverter drive mode and a current temperature of a switching element of the first inverter unit or the second inverter unit.

2. The apparatus of claim 1, wherein the control unit is configured to: drive the load in the two-stage inverter mode by turning off the mode switching unit, and drive the load in the one-stage inverter mode by turning on the mode switching unit.

3. The apparatus of claim 1, wherein the mode switching unit includes three switches that are connected for phases U, V, and W, respectively, and
   wherein input terminals of the three switches are respectively connected to lines for phases U, V and W, and output terminals of the three switches are connected in a shared manner to each other.

4. The apparatus of claim 1, wherein switching elements that are used in the first inverter unit include a SiC MOSFET, and wherein switching elements that are used in the second inverter unit include a Si IGBT.

5. The apparatus of claim 1, wherein, when a current inverter driving mode is the one-stage inverter mode, a current temperature of a switching element is lower than a first reference temperature, and a modulation index is lower than a minimum value of a designated hysteresis loop, the control unit is configured to drive the two-stage inverter in the one-stage inverter mode, but using a space vector pulse width modulation (SVPWM).

6. The apparatus of claim 1, wherein, when a current inverter driving mode is the one-stage inverter mode, a current temperature of a switching element of the first inverter unit is lower than a first reference temperature, and a modulation index is higher than a minimum value of a designated hysteresis loop and is not lower than a maximum value of the designated hysteresis loop, the control unit is configured to drive the two-stage inverter in the two-stage inverter mode, but using a space vector pulse width modulation (SVPWM).

7. The apparatus of claim 1, wherein, when a current inverter driving mode is the one-stage inverter mode, a current temperature of a switching element of the first inverter unit is lower than a first reference temperature, and a modulation index is higher than a minimum value of a designated hysteresis loop and is lower than a maximum value of the designated hysteresis loop, the control unit does not change the current inverter driving mode.

8. The apparatus of claim 1, wherein, when a current inverter driving mode is not the one-stage inverter mode, and a current temperature of a switching element of the second inverter unit is not lower than a second reference temperature, the control unit is configured to drive the two-stage inverter in the two-stage inverter mode, but using a Discontinuous Pulse Width Modulation (DPWM).

9. The apparatus of claim 1, wherein, when a current inverter driving mode is not the one-stage inverter mode, a current temperature of a switching element of the second inverter unit is lower than a second reference temperature, and a modulation index is not lower than a maximum value of a designated hysteresis loop, the control unit is configured to drive the two-stage inverter in the two-stage inverter mode, but using a Space Vector Pulse Width Modulation (SVPWM).

10. The apparatus of claim 1, wherein, when a current inverter driving mode is not the one-stage inverter mode, a current temperature of a switching element of the second inverter unit is lower than a second reference temperature, a modulation index is lower than a maximum value of a designated hysteresis loop, and the modulation index is lower than a minimum value of the designated hysteresis loop, the control unit is configured to drive the two-stage inverter in the one-stage inverter mode, but using a Space Vector Pulse Width Modulation (SVPWM).

11. The apparatus of claim 1, wherein, when a current inverter driving mode is not the one-stage inverter mode, a current temperature of a switching element of the second inverter unit is lower than a second reference temperature, a modulation index is lower than a maximum value of a designated hysteresis loop, and the modulation index is higher than a minimum value of the designated hysteresis loop and is lower than the maximum value of the designated hysteresis loop, the control unit does not change the current inverter driving mode.

12. A method of enabling a two-stage inverter to switch between modes, the method comprising:
   checking, by a controller of a two-stage inverter, whether or not a current inverter driving mode is a one-stage inverter mode;
   comparing, by the controller, a current temperature of a switching element of a first inverter unit with a first reference temperature; and driving, by the controller, the two-stage inverter in the one-stage inverter mode, but using a Discontinuous Pulse Width Modulation (DPWM) when the current temperature of the switching element of the first inverter unit is not lower than the first reference temperature.

13. The method of claim 12, the method further comprising:
   driving, by the controller, the two-stage inverter in the one-stage inverter mode, but using a Space Vector Pulse Width Modulation (SVPWM), when the current inverter driving mode is the one-stage inverter mode, the current temperature of the switching element of the first inverter unit is lower than the first reference temperature, and a modulation index is lower than a minimum value of a designated hysteresis loop.

14. The method of claim 12, the method further comprising:
   driving, by the controller, the two-stage inverter in a two-stage inverter mode, but using a Space Vector Pulse Width Modulation (SVPWM), when the current inverter driving mode is the one-stage inverter mode, the current temperature of the switching element of the first inverter unit is lower than the first reference temperature, and a modulation index is higher than a minimum value of a designated hysteresis loop and is not lower than a maximum value of the designated hysteresis loop.

15. The method of claim 12, the method further comprising:
   not changing, by the controller, the current inverter driving mode, when the current inverter driving mode is the one-stage inverter mode, the current temperature of the switching element of the first inverter unit is lower than the first reference temperature, and a modulation index is higher than a minimum value of a designated hysteresis loop and is lower than a maximum value of the designated hysteresis loop.

16. The method of claim 12, the method further comprising:
   driving, by the controller, the two-stage inverter in a two-stage inverter mode, but using the DPWM, when the current inverter driving mode is not the one-stage inverter mode, and a current temperature of a switching element of a second inverter unit is not lower than a second reference temperature.

17. The method of claim 12, the method further comprising:
   driving, by the controller, the two-stage inverter in a two-stage inverter mode, but using a Space Vector Pulse Width Modulation (SVPWM), when the current inverter driving mode is not the one-stage inverter mode, a current temperature of a switching element of a second inverter unit is lower than a second reference temperature, and a modulation index is not lower than a maximum value of a designated hysteresis loop.

18. The method of claim 12, the method further comprising:
   driving, by the controller, the two-stage inverter in the one-stage inverter mode, but using a Space Vector Pulse Width Modulation (SVPWM), when the current inverter driving mode is not the one-stage inverter mode, a current temperature of a switching element of a second inverter unit is lower than a second reference temperature, a modulation index is lower than a maximum value of a designated hysteresis loop, and the modulation index is higher than a minimum value of the designated hysteresis loop and is not lower than the maximum value of the designated hysteresis loop.

19. The method of claim 12, the method further comprising:
   not changing, by the controller, the current inverter driving mode when the current inverter driving mode is not the one-stage inverter mode, a current temperature of a switching element of a second inverter unit is lower than a second reference temperature, a modulation index is lower than a maximum value of a designated hysteresis loop, and the modulation index is higher than a minimum value of the designated hysteresis loop and is lower than the maximum value of the designated hysteresis loop.

* * * * *